US012767611B2

(12) United States Patent
Murakami

(10) Patent No.: US 12,767,611 B2
(45) Date of Patent: Oct. 20, 2026

(54) CERAMIC SHEET AND METHOD OF PRODUCING SAME

(71) Applicant: ZEON CORPORATION, Tokyo (JP)

(72) Inventor: Yasuyuki Murakami, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 237 days.

(21) Appl. No.: 18/561,043

(22) PCT Filed: May 17, 2022

(86) PCT No.: PCT/JP2022/020569
§ 371 (c)(1),
(2) Date: Nov. 15, 2023

(87) PCT Pub. No.: WO2022/255092
PCT Pub. Date: Dec. 8, 2022

(65) Prior Publication Data

US 2024/0360046 A1 Oct. 31, 2024

(30) Foreign Application Priority Data

Jun. 4, 2021 (JP) ................................. 2021-094584

(51) Int. Cl.
*C04B 41/45* (2006.01)
*C04B 35/10* (2006.01)
*C04B 35/634* (2006.01)
*C04B 41/00* (2006.01)
*C04B 41/91* (2006.01)

(52) U.S. Cl.
CPC .......... *C04B 41/4501* (2013.01); *C04B 35/10* (2013.01); *C04B 35/63444* (2013.01); *C04B 41/0072* (2013.01); *C04B 41/91* (2013.01); *C04B 2235/3217* (2013.01); *C04B 2237/343* (2013.01); *C04B 2237/525* (2013.01); *C04B 2237/704* (2013.01)

(58) Field of Classification Search
CPC . C04B 41/0072; C04B 41/4501; C04B 35/10; C04B 35/63444
See application file for complete search history.

(56) References Cited

U.S. PATENT DOCUMENTS 6,660,414 B1 12/2003 Xiang et al.
2019/0054718 A1* 2/2019 Ito ......................... B32B 37/182
2022/0039293 A1* 2/2022 Mizoguchi Gorgoll ..................... H05K 7/20481

FOREIGN PATENT DOCUMENTS

| | | | | | |
|---|---|---|---|---|---|
| CN | 106832782 | A | | 6/2017 | |
| JP | 2001019555 | A | * | 1/2001 | |
| JP | 2002193672 | A | | 7/2002 | |
| JP | 2006264316 | A | | 10/2006 | |
| JP | 2012023335 | A | * | 2/2012 | |
| JP | 2012201106 | A | * | 10/2012 | |
| JP | 2018067695 | A | | 4/2018 | |
| WO | WO-2020145341 | A1 | * | 7/2020 | ............. C01G 39/00 |

OTHER PUBLICATIONS

Machine translation of JP2012201106A (Year: 2012).*
Machine translation of JP2001019555A (Year: 2001).*
Machine translation of JP2012023335 (Year: 2012).*
Wikipedia Aluminum Oxide, https://en.wikipedia.org/wiki/Aluminium_oxide, accessed Feb. 23, 2026 (Year: 2026).*
Poly(vinyl butyral-co-vinyl alcohol-co-vinyl acetate), https://www.sigmaaldrich.com/US/en/product/aldrich/182567?srsltid=AfmBOopadAofSZu8pCHTfpBqOBAujeC-9-Mn8Gcae4hWxGox1P_iy6AQ, accessed Feb. 23, 2026 (Year: 2026).*
Machine translation of WO2020145341A1 (Year: 2020).*
Takatori et al. ("Microstructural evolution of high purity alumina ceramics", Journal of the Ceramic Society of Japan 124, 4, 2016, p. 432-441 (Year: 2016).*
Nov. 21, 2023, International Preliminary Report on Patentability issued in the International Patent Application No. PCT/JP2022/020569.
Jun. 28, 2022, International Search Report issued in the International Patent Application No. PCT/JP2022/020569.

* cited by examiner

*Primary Examiner* — Ariella Machness
(74) *Attorney, Agent, or Firm* — KENJA IP LAW PC

(57) ABSTRACT

A method of producing a ceramic sheet includes: shaping a composition containing a resin and a ceramic material into a sheet-like form through pressure application to perform primary sheet shaping; stacking a plurality of the primary sheet in a thickness direction or performing folding or winding of the primary sheet to obtain a laminate; slicing the laminate at an angle of 45° or less relative to a stacking direction to obtain a secondary sheet; and firing the secondary sheet.

4 Claims, No Drawings

CERAMIC SHEET AND METHOD OF PRODUCING SAME

TECHNICAL FIELD

The present disclosure relates to a ceramic sheet and a method of producing the same.

BACKGROUND

Ceramic sheets have conventionally been used in a wide range of applications. Controlling the structure of a ceramic sheet is known to enable improvement of various attributes. For example, Patent Literature (PTL) 1 proposes a method of producing an oriented ceramic sintered body by dispersing a specific non-ferromagnetic powder in a solvent to obtain a slurry, performing solidification and shaping of this slurry in a magnetic field, and subsequently performing sintering and also proposes an oriented alumina ceramic sintered body that, at a plane in which a C-plane of alumina crystals is oriented, has a (006) diffraction intensity that is at least 1.2 times (110) diffraction intensity according to X-ray diffraction.

CITATION LIST

Patent Literature

PTL 1: JP2002-193672A

SUMMARY

Technical Problem

In recent years, there has been a need for ceramic sheets excelling in terms of different attributes to ceramic sheets that have previously been provided. Accordingly, an object of the present disclosure is to provide a ceramic sheet having a novel orientation structure.

Solution to Problem

The inventor conducted diligent studies with the aim of achieving the object described above. The inventor made a new discovery that a ceramic sheet having a novel orientation structure is obtained by, with respect to a primary sheet that is obtained through shaping of a composition containing a resin and a ceramic material into a sheet-like form, performing stacking of a plurality of such primary sheets in a thickness direction to obtain a laminate, slicing this laminate to obtain a secondary sheet, and then firing the secondary sheet, and, in this manner, the inventor completed the present disclosure.

Specifically, the present disclosure aims to advantageously solve the problem set forth above, and a presently disclosed method of producing a ceramic sheet comprises: shaping a composition containing a resin and a ceramic material into a sheet-like form through pressure application to obtain a primary sheet; stacking a plurality of the primary sheet in a thickness direction or performing folding or winding of the primary sheet to obtain a laminate; slicing the laminate at an angle of 45° or less relative to a stacking direction to obtain a secondary sheet; and firing the secondary sheet.

According to such a production method, it is possible to efficiently provide a ceramic sheet having a novel orientation structure.

In the presently disclosed method of producing a ceramic sheet, it is preferable that debinding of the secondary sheet is performed through heating in an atmosphere of 300° C. or higher in advance of the firing, and the firing is performed in an atmosphere of 1000° C. or higher. According to such a production method, it is possible to more efficiently provide a ceramic sheet having a novel orientation structure.

Note that the temperatures in the debinding and the firing are temperatures at 1 atm.

In the presently disclosed method of producing a ceramic sheet, the primary sheet preferably has a thickness of 2.5 mm or less. According to such a production method, it is possible to more efficiently provide a ceramic sheet having a novel orientation structure.

In the presently disclosed method of producing a ceramic sheet, a volume fraction of the ceramic material in the primary sheet is preferably not less than 50 volume % and not more than 75 volume % based on total volume of the resin and the ceramic material. According to such a production method, it is possible to increase the quality of a ceramic sheet having a novel orientation structure.

Moreover, the present disclosure aims to advantageously solve the problem set forth above, and a presently disclosed ceramic sheet comprises a sintered body of a ceramic, wherein the ceramic sheet gives a positive a-axis value upon Lotgering analysis. Such a ceramic sheet has a novel orientation structure.

Note that Lotgering analysis of a ceramic sheet can be performed according to a method described in the EXAMPLES section.

In the presently disclosed ceramic sheet, it is preferable that the ceramic sheet gives a negative c-axis value upon Lotgering analysis. In a case in which the ceramic sheet gives a negative c-axis value upon Lotgering analysis, there is relatively high orientation of the a-axis, and, in association therewith, suitable attributes can be displayed.

In the presently disclosed ceramic sheet, the ceramic may include alumina. A ceramic sheet that contains alumina as a ceramic has excellent quality.

In the presently disclosed ceramic sheet, the ceramic preferably includes a flaky ceramic. When the ceramic sheet contains a flaky ceramic, the ceramic sheet has excellent thermal conductivity. In the presently disclosed ceramic sheet, a proportion constituted by the flaky ceramic in the ceramic is preferably 65 volume % or less. When the proportion constituted by the flaky ceramic is 65 volume % or less of all ceramic, strength of the ceramic sheet can be increased.

Advantageous Effect

According to the present disclosure, it is possible to provide a ceramic sheet having a novel orientation structure.

DETAILED DESCRIPTION

The following provides a detailed description of embodiments of the present disclosure.

(Ceramic Sheet)

The presently disclosed ceramic sheet is a ceramic sheet that is formed of a sintered body of a ceramic and that has a novel orientation structure. More specifically, the presently disclosed ceramic sheet gives a positive a-axis value upon Lotgering analysis, and an a-axis among crystallographic axes of the constituent ceramic of the ceramic sheet is oriented in a thickness direction of the ceramic sheet (i.e., the a-axis is parallel to the thickness direction). Such a ceramic sheet has excellent thermal conductivity in the thickness direction and also has anisotropy of thermal conductivity in terms that thermal conductivity in the thickness direction is higher than thermal conductivity in a direction of a main surface of the ceramic sheet. Herein, “main surface of the ceramic sheet” refers to at least one surface of the ceramic sheet.

The phrase “an a-axis among crystallographic axes of the ceramic is oriented in a thickness direction of the ceramic sheet” as used with regards to the presently disclosed ceramic sheet means that constituent ceramic crystals of the ceramic sheet are oriented in an a-axis direction and that the a-axis direction roughly matches the thickness direction of the ceramic sheet. When the a-axis direction of ceramic crystals in the ceramic sheet is oriented in the thickness direction of the sheet, such a ceramic sheet has excellent thermal conductivity and can display anisotropy of thermal conductivity in terms that thermal conductivity in the thickness direction is higher than thermal conductivity in a main surface direction of the sheet.

In the present specification, it is possible to determine that constituent ceramic crystals of a ceramic sheet are “oriented in an a-axis direction” not only through a positive a-axis value upon Lotgering analysis, but also based on a value (hereinafter, also denoted as “a/c”) that is obtained by dividing scattering intensity at a plane corresponding to an a-axis direction of the crystals by scattering intensity at a plane corresponding to a c-axis direction of the crystals as determined by X-ray diffraction (XRD) described in the EXAMPLES section.

A value (hereinafter, also referred to as a “ceramic perpendicular orientation parameter”) that is obtained by dividing an a/c value in a state in which the a-axis direction is oriented in the thickness direction of the ceramic sheet by an a/c value in a state in which the a-axis direction is not oriented in the thickness direction of the ceramic sheet according to a method described in the EXAMPLES section is preferably 1.50 or more, more preferably 1.55 or more, preferably 3.00 or more, and particularly preferably 3.60 or more. When the value of the perpendicular orientation parameter is not less than any of these lower limits, the a-axis direction of ceramic crystals is even better oriented in the thickness direction of the ceramic sheet, and such a ceramic sheet has even better thermal conductivity.

The a-axis value (Lotgering factor) of the ceramic sheet upon Lotgering analysis is required to be positive, is more preferably 0.010 or more, and is even more preferably 0.020 or more. Such a ceramic sheet has even better thermal conductivity in the thickness direction and has high anisotropy of thermal conductivity. Note that the upper limit for the a-axis value upon Lotgering analysis is not specifically limited and can be 1.000 or less, for example. According to the theory of Lotgering analysis, a Lotgering factor has a value of 1.000 in a situation in which there is perfect orientation, whereas the Lotgering factor has a value of zero in a situation in there is no orientation. A value of closer to 1 for the Lotgering factor indicates higher orientation.

Moreover, the c-axis value (Lotgering factor) of the ceramic sheet upon Lotgering analysis is preferably negative, and is preferably −0.0001 or less, and more preferably −0.0010 or less. Such a ceramic sheet has even better thermal conductivity in the thickness direction and high anisotropy of thermal conductivity as a result of the a-axis being relatively oriented. Note that the lower limit for the c-axis value upon Lotgering analysis is not specifically limited and can be −0.0030 or more, for example. According to the theory of Lotgering analysis, a negative value for a Lotgering factor indicates that the proportion in which crystal grains oriented along the c-axis are present is lower than in an unoriented sample (i.e., the proportion in which crystals grains oriented along an axis other than the c-axis are present is comparatively high).

Furthermore, a value (hereinafter, also referred to as an “anisotropy parameter of thermal conductivity”) obtained by dividing the thermal conductivity of the ceramic sheet in the thickness direction by the thermal conductivity of the ceramic sheet in a main surface direction is preferably 1.01 or more, and more preferably 1.05 or more. Such a ceramic sheet has anisotropy in relation to thermal conductivity. The upper limit for the anisotropy parameter of thermal conductivity is not specifically limited and can be 3.0 or less, for example.

The constituent ceramic of the ceramic sheet may be alumina, barium titanate, boron nitride, silicon nitride, silicon carbide, hydroxyapatite, or the like without any specific limitations. It is preferable that the constituent ceramic of the ceramic sheet includes alumina. In a case in which the ceramic includes alumina, the ceramic sheet has high quality.

Moreover, the constituent ceramic of the ceramic sheet preferably includes a flaky ceramic. A ceramic sheet that contains a flaky ceramic has excellent thermal conductivity. In this case, the proportion constituted by the flaky ceramic relative to the total volume of the ceramic is preferably 65 volume % or less, more preferably 55 volume % or less, and even more preferably 40 volume % or less. When the proportion constituted by the flaky ceramic relative to the total volume of the ceramic is not more than any of the upper limits set forth above, the ceramic sheet has high quality. In more detail, by using a composition that results in the proportion constituted by a flaky ceramic being not more than any of the upper limits set forth above in production of the ceramic sheet according to the presently disclosed production method described further below, it is possible to inhibit strip peeling during a firing step and to increase the quality of the obtained ceramic sheet. Moreover, from a viewpoint of achieving even better crystallographic axis orientation of the ceramic, it is preferable that in a case in which the ceramic sheet contains a flaky ceramic, the proportion constituted by the flaky ceramic relative to the total volume of the ceramic is 15 volume % or more.

The constituent ceramic of the ceramic sheet may include a particulate ceramic in addition to or instead of the flaky ceramic described above. The ceramic sheet is formed of a sintered body of these ceramics. Accordingly, the flaky ceramic or particulate ceramic is not present as independent units in the ceramic sheet, but instead forms a dense structure in which a plurality of units thereof are bonded to one another.

(Production Method of Ceramic Sheet)

The presently disclosed ceramic sheet having features such as set forth above can be efficiently produced according to the presently disclosed method of producing a ceramic sheet. The presently disclosed method of producing a ceramic sheet includes: shaping a composition containing a resin and a ceramic material into a sheet-like form through pressure application to obtain a primary sheet (primary sheet shaping step); stacking a plurality of the primary sheet in a thickness direction or performing folding or winding of the primary sheet to obtain a laminate (laminate formation step); slicing the laminate at an angle of 45° or less relative to a stacking direction to obtain a secondary sheet (slicing step); and firing the secondary sheet (firing step). In addition, the presently disclosed production method preferably includes performing debinding of the secondary sheet through heating in an atmosphere of 400° C. or higher (debinding step) in advance of the firing step. The following describes each of the steps.

<Primary Sheet Shaping Step>

In the primary sheet shaping step, a composition that contains a resin and a ceramic material is shaped into a sheet-like form through pressure application to obtain a primary sheet.

[Composition]

The composition can be produced by mixing the resin, the ceramic material, and other optional components.

—Ceramic Material—

A ceramic material formed of any of the previously described types of ceramics that can be contained in the presently disclosed ceramic sheet can be used as the ceramic material. In a case in which the ceramic material has a particulate form, a particulate ceramic material having a volume-average particle diameter D50 of not less than 0.4 μm and not more than 10.0 μm can be used without any specific limitations. Moreover, in a case in which the ceramic material has a flaky form, a flaky ceramic material having a volume-average particle diameter D50 of not less than 2 μm and not more than 10 μm can be used without any specific limitations. Note that when a ceramic material is referred to as "particulate", this means that the ceramic material has an aspect ratio of 5 or less. The aspect ratio can be determined by observing the ceramic material using an SEM (scanning electron microscope), measuring the maximum diameter (major diameter) and the particle diameter (minor diameter) in a direction orthogonal to the maximum diameter for 50 arbitrary units of the ceramic material, and calculating an average value for the ratio of the major diameter and the minor diameter (major diameter/minor diameter). Note that in a case in which a flaky ceramic material, for example, is observed using an SEM during the above, the "major diameter" is the length in a major axis direction of a main surface of the flaky ceramic material, whereas the "minor diameter" is the length in a direction orthogonal to the major axis of the main surface that is in the same plane as the main surface.

Moreover, in the ceramic material, it is preferable that a c-axis of crystal grains tends to be oriented in a thickness direction. With regards to the "thickness" direction of a particulate ceramic material, the longest axis when the particulate ceramic material is approximated as a pseudoellipsoid is defined, two axes orthogonal to the longest axis (and also orthogonal to each other) are determined, and the direction of a shorter axis among these two axes is regarded as the thickness direction. Moreover, in the case of a flaky ceramic material, a direction perpendicular to a main surface direction is regarded as the thickness direction. When saying that "a c-axis of crystal grains tends to be oriented" in a ceramic material, this means that crystal grains are arrayed regularly in a secondary crystal (i.e., the ceramic material). With such a ceramic material, it is easy for an orientation effect to be realized through orientation using the presently disclosed production method.

—Resin—

Various types of resins can be used as the resin without any specific limitations. Examples of such resins include polyolefin crystalline resins indicated by the group consisting of polyethylene crystalline resins such as linear or branched high-density polyethylene, low-density polyethylene, and ultra-high molecular weight polyethylene, polypropylene crystalline resins such as linear or branched high-density polypropylene and low-density polypropylene, polymethylpentene, polybutene, polymethylbutene, polymethylhexene, polyvinylnaphthalene, polyxylylene, and so forth, polyester crystalline resins indicated by the group consisting of polyethylene terephthalate (PET), polybutylene terephthalate (PBT), polyethylene naphthalate, aromatic polyesters, and so forth, polyamide crystalline resins indicated by the group consisting of nylon-6, nylon-66, nylon-12, polyamide imide, and so forth, crystalline fluororesins indicated by the group consisting of polyvinylidene fluoride, polytetrafluoroethylene, and so forth, and also other crystalline resins such as rosin resin, polyvinylidene chloride, polyacrylonitrile, syndiotactic polystyrene, polyoxymethylene, polyphenylene sulfide (PPS), polyether ether ketone (PEEK), cellulose, acetal resin, chlorinated polyether, ethylene-vinyl acetate copolymer, and liquid-crystal polymers (aromatic polycycle condensation polymers); and elastomers such as acrylonitrile butadiene rubber, styrene-butadiene-styrene block copolymer, styrene-ethylene-butylene-styrene copolymer, styrene-isoprene-styrene block copolymer, styrene-ethylene-propylene-styrene copolymer, silicone rubber, and fluororubber. Of these resins, acrylonitrile butadiene rubber is preferable.

—Other Components—

Other components that can be used in shaping of a primary sheet can be further compounded as necessary as other components that can optionally be compounded in the composition. Examples of other components that can be compounded in the composition include, but are not specifically limited to, cross-linkers; reaction initiators; flame retardants such as red phosphorus flame retardants and phosphate ester flame retardants; plasticizers such as fatty acid ester plasticizers; toughness modifiers such as urethane acrylate; desiccants such as calcium oxide and magnesium oxide; adhesion enhancers such as silane coupling agents, titanium coupling agents, and acid anhydrides; wettability enhancers such as non-ionic surfactants and fluorinated surfactants; and ion trapping agents such as inorganic ion exchangers.

Mixing of the above-described components can be performed without any specific limitations using a known mixing device such as a kneader, a mixer (Henschel mixer, Hobart mixer, high-speed mixer, etc.), a twin-screw kneader, or a roll. Moreover, the mixing may be performed in the presence of a solvent. The resin may be dissolved or dispersed in a solvent in advance to obtain a resin solution and may then be mixed with the ceramic material and other optional components. The mixing time can be set as not less than 5 minutes and not more than 60 minutes, for example. Moreover, the mixing temperature can be set as not lower than 5° C. and not higher than 160° C., for example.

[Shaping of Composition]

The composition produced as described above can be shaped into a sheet-like form through pressure application after optionally being subjected to degassing and pulverization. A sheet-like product obtained through shaping of the composition by pressure application in this manner can be taken to be a primary sheet. Note that in a situation in which a solvent is used during mixing, it is preferable that the solvent is removed before performing shaping into a sheet-like form. For example, solvent removal can be performed concurrently with degassing by performing the degassing using vacuum degassing.

The composition can be shaped into a sheet-like form using any known shaping method such as pressing, rolling, or extrusion without any specific limitations so long as it is a shaping method in which pressure is applied.

[Primary Sheet]

In the primary sheet obtained through shaping of the composition into a sheet-like form by pressure application, it is presumed that the ceramic material is mainly aligned in an in-plane direction. The "ceramic material" that is aligned in an in-plane direction at the primary sheet stage is a polycrystalline body that is an assembly of a plurality of crystal grains. The polycrystalline body is aligned in an in-plane direction in the primary sheet, but it is presumed that the crystallographic axes of the plurality of crystal grains constituting the polycrystalline body do not significantly change from the state of the polycrystalline body serving as a raw material at this stage. The a-axis orientation increases in a ceramic sheet that is ultimately obtained through the subsequently described laminate formation step and slicing step.

The thickness of the primary sheet is preferably 2.5 mm or less, more preferably 2.0 mm or less, and even more preferably 1.5 mm or less. When the thickness of the primary sheet is not more than any of the upper limits set forth above, crack formation or splitting of the sheet due to shrinkage in the subsequent firing step can be inhibited well, and a ceramic sheet can be efficiently formed. Note that no specific limitations are placed on the lower limit for the thickness of the primary sheet, and the thickness can be 0.1 mm or more, for example.

The volume fraction of the ceramic material in the primary sheet based on the total volume of the resin and the ceramic material is preferably 50 volume % or more, more preferably 55 volume % or more, and even more preferably 60 volume % or more, and is preferably 75 volume % or less, and more preferably 70 volume % or less. When the volume fraction of the ceramic material in the primary sheet is not less than any of the lower limits set forth above, cracking or splitting of the ceramic sheet in the subsequently described firing step can be inhibited well, firing shrinkage can be reduced, and the quality of an obtained ceramic sheet can be increased. When the volume fraction of the ceramic material in the primary sheet is not more than any of the upper limits set forth above, the quality of an obtained ceramic sheet can be increased by preventing cracking and splitting of the primary sheet itself prior to firing.

<Laminate Formation Step>

In the laminate formation step, a laminate is obtained by stacking a plurality of the primary sheet in a thickness direction or performing folding or winding of the primary sheet. Formation of a laminate by folding of the primary sheet can be performed by using a folding device to fold the primary sheet at a fixed width without any specific limitations. Moreover, formation of a laminate by winding of the primary sheet can be performed by winding the primary sheet around an axis that is parallel to a transverse direction or a longitudinal direction of the primary sheet without any specific limitations. Furthermore, formation of a laminate by stacking of primary sheets can be performed using a stacking device without any specific limitations. For example, by using a sheet stacking device (produced by Nikkiso Co., Ltd.; product name: Hi-Stacker), it is possible to inhibit infiltration of air between layers and to thereby efficiently obtain a good laminate.

Note that in the stacking step, it is preferable that pressure is applied to the obtained laminate in the stacking direction (secondary pressure application) while the laminate is being heated. By performing secondary pressure application in which pressure is applied to the laminate in the stacking direction while the laminate is being heated, it is possible to promote fusion between the stacked primary sheets.

The pressure during application of pressure to the laminate in the stacking direction can be set as not less than 0.05 MPa and not more than 0.50 MPa. Moreover, the heating temperature of the laminate is not specifically limited but is preferably not lower than 50° C. and not higher than 170° C. Furthermore, the heating time of the laminate can be set as not less than 10 seconds and not more than 30 minutes, for example.

In the laminate obtained through stacking, folding, or winding of the primary sheet, it is presumed that the ceramic material (polycrystalline body) is oriented in a direction roughly orthogonal to the stacking direction. For example, in a case in which the ceramic material includes a flaky ceramic, the direction of a major axis of a main surface of the flaky ceramic is presumed to be roughly orthogonal to the stacking direction.

<Slicing Step>

In the slicing step, the laminate obtained in the step described above is sliced at an angle of 45° or less relative to the stacking direction to obtain a secondary sheet. The method by which the laminate is sliced is not specifically limited and may be a multi-blade method, a laser processing method, a water jet method, a knife processing method, or the like, for example. Of these methods, a knife processing method is preferable in terms that it is easy to obtain a uniform secondary sheet thickness. The cutting tool used to slice the laminate is not specifically limited and may be a slicing member that has a smooth board surface with a slit and a blade protruding from the slit (for example, a plane or slicer equipped with a sharp blade).

Note that from a viewpoint of increasing thermal conductivity of an obtained ceramic sheet in a thickness direction, the angle at which the laminate is sliced is preferably 30° or less relative to the stacking direction, more preferably 15° or less relative to the stacking direction, and preferably roughly 0° relative to the stacking direction (i.e., a direction along the stacking direction).

A secondary sheet that is obtained in this manner has the ceramic material (polycrystalline body) oriented well in the thickness direction and has excellent thermal conductivity in the thickness direction.

<Debinding Step>

In the optionally performed debinding step, debinding of the secondary sheet is performed through heating in an atmosphere of 300° C. or higher. The temperature of the atmosphere in the debinding step is more preferably 350° C. or higher, and even more preferably 400° C. or higher. The upper limit for the heating temperature in the debinding step is required to be lower than the temperature of an atmosphere in the firing step and can be 600° C. or lower, for example. When the temperature of the atmosphere in the debinding step is not lower than any of the lower limits set forth above, the debinding step can be performed such that the resin contained in the primary sheet does not remain. Moreover, when the temperature of the atmosphere in the debinding step is not higher than the upper limit set forth above, the debinding step can be performed such that the resin contained in the primary sheet is not carbonized.

The debinding step is preferably performed at normal pressure (1 atm) in an atmosphere of an inert gas (for example, nitrogen gas or argon gas).

<Firing Step>

In the firing step, the secondary sheet is fired. The atmosphere in the firing step is preferably 1000° C. or higher, and more preferably 1500° C. or higher, and is preferably 2000° C. or lower. When the temperature of the atmosphere in the firing step is not lower than any of the lower limits set forth above, the ceramic can be more densely sintered.

The firing step is preferably performed at normal pressure (1 atm) in an atmosphere of an inert gas (for example, nitrogen gas or argon gas) in the same manner as the debinding step.

According to the presently disclosed production method including steps such as set forth above, it is possible to efficiently produce the presently disclosed ceramic sheet (i.e., to efficiently produce a ceramic sheet that is formed of a sintered body of a ceramic and in which an a-axis among crystallographic axes of the constituent ceramic of the ceramic sheet is oriented in a thickness direction of the ceramic sheet).

EXAMPLES

The following provides a more specific description of the present disclosure based on examples. However, the present disclosure is not limited to the following examples. In the following description, "%" and "parts" used in expressing quantities are by mass, unless otherwise specified.

In each of the examples and comparative examples, various attributes and evaluations were measured or evaluated according to the following methods.

<Thermal Conductivity>

Thermal diffusivity α ($m^2$/s), specific heat at constant pressure Cp (J/g·K), and specific gravity ρ (g/$m^3$) were measured by the following methods in a main surface of a ceramic sheet.

[Thermal Diffusivity α ($m^2$/s)]

A thermophysical property measurement device (produced by BETHEL Co., Ltd.; product name: Thermowave Analyzer TA35) was used to measure thermal diffusivity in X, Y, and Z directions.

[Specific Heat at Constant Pressure Cp (J/g·K)]

A differential scanning calorimeter (produced by Rigaku Corporation; product name: DSC8230) was used to measure specific heat under heating conditions of 10° C./min.

[Specific Gravity ρ (g/$m^3$)]

An automatic specific gravity meter (produced by Toyo Seiki Seisaku-sho, Ltd.; product name: DENSIMETER-H) was used to measure specific gravity (density) (g/$m^3$).

The obtained measurement values were substituted into the following formula (I):

$$\lambda = \alpha \times Cp \times \rho \tag{I}$$

so as to determine the thermal conductivity λ (W/m·K) in X, Y, and Z directions for the ceramic sheet.

<Anisotropy of Thermal Conductivity>

The thermal conductivities λ in the X, Y, and Z directions determined for a ceramic sheet as described above were used to calculate anisotropy of thermal conductivity by dividing the thermal conductivity in the Z direction by whichever was larger among the thermal conductivity in the X direction and the thermal conductivity in the Y direction.

<Measurement of XRD Profile>

With respect to a ceramic sheet obtained in each example or comparative example (with the exception of Comparative Example 2) and ceramic particles serving as an unoriented sample, an XRD device (produced by Rigaku Corporation; product name: RINT 2200) was used to measure an XRD profile in a range of 2θ=20° to 90° upon irradiation with X-rays. The ceramic particles serving as an unoriented sample were produced by pulverizing the ceramic sheet obtained in each example or comparative example to a powdered form in a mortar. More specifically, measurement was performed under conditions of a voltage of 40 kV and a current of 400 mA using Cu K-α radiation. Note that in the case of a ceramic sheet, the XRD profile was measured with respect to the sheet surface.

<<Lotgering Analysis>>

The a-axis orientation and c-axis orientation were calculated from the obtained XRD profile according to the Lotgering method. Specifically, a Lotgering factor f relating to orientation for each axis was calculated according to the following procedure.

The Lotgering factor f was calculated by the following formula (1) using the peak intensity of X rays diffracted from a crystal plane taken as a subject.

$$f = (\rho - \rho_0)/(1 - \rho_0) \tag{1}$$

Note that $\rho_0$ was calculated using the X-ray diffraction intensity ($I_0$) for the unoriented sample. In the case of c-axis orientation, $\rho_0$ was determined by the following formula (2) as a proportion of the total of diffraction intensity for all planes perpendicular to the c-axis (C-axis perpendicular planes) relative to the sum of all diffraction intensities ($\Sigma I_0$(hkl)).

$$\rho_0 = \sum I_0(C\text{-axis perpendicular planes})/\sum I_0(hkl) \tag{2}$$

ρ was calculated using the X-ray diffraction intensity (I) for an oriented sample. In the case of c-axis orientation, ρ was determined by the following formula (3), similarly to the preceding formula (2), as a proportion of the total of diffraction intensity for C-axis perpendicular planes relative to the sum of all diffraction intensities (ΣI(hkl)).

$$\rho = \sum I(C\text{-axis perpendicular planes})/\sum I(hkl) \tag{3}$$

In the case of a-axis orientation, the Lotgering factor f was also calculated by the same procedure as described above.

<<Calculation of Scattering Intensity Ratio>>

For Examples 1 to 7 and Comparative Examples 1 and 2 in which alumina was used as a ceramic material, the scattering intensity at a (300) plane (2θ=68°; scattering intensity at plane corresponding to a-axis direction) in the XRD profile was divided by the scattering intensity at a (006) plane (2θ=37°; scattering intensity at plane corresponding to c-axis direction) in the XRD profile so as to evaluate the degree of orientation (a/c) in the a-axis direction.

For Example 8 and Comparative Example 3 in which barium titanate was used as a ceramic material, the scattering intensity at a (200) plane (2θ=44.8°; scattering intensity at plane corresponding to a-axis direction) in the XRD profile was divided by the scattering intensity at a (002) plane (2θ=45.4°; scattering intensity at plane corresponding to c-axis direction) in the XRD profile so as to evaluate the degree of orientation (a/c) in the a-axis direction.

<Perpendicular Orientation Parameter>

For Examples 1 to 7 in which alumina was used as a ceramic material, the a/c value calculated in each of these examples was taken to be "an a/c value in a state in which the a-axis direction is oriented in the thickness direction of the ceramic sheet", the a/c value in Comparative Example 1 determined as previously described was taken to be "an a/c value in a state in which the a-axis direction is not oriented in the thickness direction of the ceramic sheet", and the former of these a/c values was divided by the latter of these a/c values to calculate a perpendicular orientation parameter of the ceramic.

For Example 8 in which barium titanate was used as a ceramic material, the a/c value calculated in Example 8 was divided by the a/c value calculated in Comparative Example 3 to calculate a perpendicular orientation parameter of the ceramic.

<Quality of Ceramic Sheet>

The quality of an obtained ceramic sheet was visually evaluated. The occurrence of a fault of separation of strips from each other in a firing step was confirmed in a situation in which there was large firing shrinkage of a secondary sheet.

A: Firing can be performed as single sheet without peeling of strips

B: Peeling of strips occurs at 1 to 4 locations and post-firing sheet separates into 2 to 5 parts C: Peeling of strips occurs at 5 or more locations in a single sheet and post-firing sheet separates into 6 or more parts

Example 1

<Primary Sheet Shaping Step>

<<Production of Composition>>

A pressurizing kneader (produced by Nihon Spindle Manufacturing Co., Ltd.) was used to perform 20 minutes of stirring and mixing at a temperature of 150° C. with respect to 62 parts of nitrile rubber (NBR) (produced by Zeon Corporation; product name: Nipol 1312; initial decomposition temperature: 336° C.) that was liquid at normal temperature and normal pressure and 62 parts of nitrile rubber (NBR) (produced by Zeon Corporation; product name: Nipol 3350; initial decomposition temperature: 375° C.) that was solid at normal temperature and normal pressure as resins, and 700 parts of a particulate alumina material (produced by Nippon Light Metal Co., Ltd.; product name: LS-711C; volume-average particle diameter: 0.5 μm; aspect ratio: 1.2) as a ceramic material.

<<Shaping of Primary Sheet>>

Next, 50 g of the resultant composition was sandwiched between sandblasted PET films (protective films) of 50 μm in thickness and was shaped by rolling (primary pressure application) under conditions of a roll gap of 1,000 μm, a roll temperature of 50° C., a roll line pressure of 50 kg/cm, and a roll speed of 1 m/min to obtain a primary sheet of 1.0 mm in thickness.

<Laminate Formation Step>

Next, the primary sheet obtained as described above was cut to 150 mm (length)×150 mm (width)×0.8 mm (thickness), 188 pieces thereof were stacked in a thickness direction of the primary sheet, and pressing (secondary pressure application) was performed in the stacking direction for 3 minutes at a temperature of 120° C. and a pressure of 0.1 MPa to obtain a laminate of roughly 150 mm in height.

<Slicing Step>

Thereafter, a laminate side surface of the laminate that had undergone secondary pressure application was pushed with a pressure of 0.3 MPa while performing slicing at an angle of 0° relative to the stacking direction (i.e., in a normal direction to a main surface of the stacked primary sheets) using a wood working slicer (produced by Marunaka Tekkosho Inc.; product name: Super Surfacer Super Meca S) to obtain a secondary sheet of 150 mm (length)×150 mm (width)×0.30 mm (thickness).

<Debinding Step Through to Firing Step>

The obtained secondary sheet was subsequently heated at 400° C. in a normal pressure nitrogen atmosphere for 3 days so as to perform a debinding step and cause combustion of a resin component (debinding step). Next, the temperature was raised to 1600° C. at a rate of 10° C./min in the same atmosphere, and 1 day of firing was performed (firing step).

The resultant ceramic sheet was used to perform various measurements and evaluations. The results are shown in Table 1.

Example 2

A ceramic sheet was obtained and various measurements and evaluations were performed in the same way as in Example 1 with the exception that in production of the composition in the primary sheet shaping step, the particulate alumina material used as a ceramic material was changed to a larger diameter particulate alumina material (produced by Nippon Light Metal Co., Ltd.; product name: LS-130F; volume-average particle diameter: 3 μm; aspect ratio: 1.2). The results are shown in Table 1.

Example 3

A ceramic sheet was obtained and various measurements and evaluations were performed in the same way as in Example 1 with the exception that in production of the composition in the primary sheet shaping step, the amount of each resin and the amount of the particulate alumina material were changed as indicated in Table 1, and 158 parts of a flaky alumina material (produced by Kinsei Matec Co., Ltd.; product name: Serath; volume-average particle diameter: 10 μm; aspect ratio: 1.8) was further added as a ceramic material. The results are shown in Table 1.

Examples 4 and 5

A ceramic sheet was obtained and various measurements and evaluations were performed in the same way as in Example 3 with the exception that in production of the composition in the primary sheet shaping step, the amount of each resin and the amount of each ceramic material were changed as indicated in Table 1. The results are shown in Table 1.

Example 6

A ceramic sheet was obtained and various measurements and evaluations were performed in the same way as in Example 1 with the exception that in production of the composition in the primary sheet shaping step, the amount of each resin and the amount of the ceramic material were changed as indicated in Table 1. The results are shown in Table 1.

Example 7

A ceramic sheet was obtained and various measurements and evaluations were performed in the same way as in Example 1 with the exception that in shaping of the primary sheet in the primary sheet shaping step, the thickness was changed to 2.0 mm. The results are shown in Table 1.

Example 8

A ceramic sheet was obtained and various measurements and evaluations were performed in the same way as in Example 1 with the exception that in production of the composition in the primary sheet shaping step, the amount of each resin was changed as indicated in Table 1, and 900 parts of barium titanate (produced by Nippon Chemical Industrial Co., Ltd.; product name: BESPA; volume-average particle diameter: 10 μm; aspect ratio: 1.1; specific gravity: 6.02) was added as a ceramic material. The results are shown in Table 1.

Comparative Example 1

A ceramic sheet was obtained in the same way as in Example 1 with the exception that the primary sheet obtained in the primary sheet shaping step was cut to 50 mm×50 mm (thickness of 1.0 mm) and was subjected to the debinding step and the firing step in that form without undergoing the slicing step. Various measurements and evaluations were performed with respect to the obtained ceramic sheet in the same way as in Example 1. The results are shown in Table 1.

Comparative Example 2

A secondary sheet that had undergone the primary sheet shaping step, the laminate formation step, and the slicing step in the same way as in Example 1 was not subjected to the debinding step through to the firing step. Measurement of thermal conductivity and calculation of an anisotropy parameter of thermal conductivity were performed with respect to the obtained sheet in the same way as in Example 1.

Comparative Example 3

A ceramic sheet was obtained in the same way as in Example 8 with the exception that the primary sheet obtained in the primary sheet shaping step was cut to 50 mm×50 mm (thickness of 1.0 mm) and was subjected to the debinding step and the firing step in that form without undergoing the slicing step. Various measurements and evaluations were performed with respect to the obtained ceramic sheet in the same way as in Example 8. The results are shown in Table 1.

TABLE 1

| | | Example 1 | Example 2 | Example 3 | Example 4 | Example 5 | Example 6 |
|---|---|---|---|---|---|---|---|
| Resin [parts by mass] | Nipol 1312 (liquid) | 62 | 62 | 70 | 90 | 70 | 62 |
| | Nipol 3350 (solid) | 62 | 62 | 70 | 38.6 | 70 | 62 |
| Ceramic material [parts by mass] | Particulate alumina: LS-711C (0.5 μm) | 700 | — | 630 | 440 | 320 | 580 |
| | Particulate alumina: LS-130F (3 μm) | — | 700 | — | — | — | — |
| | Flaky alumina: Serath (10 μm) | — | — | 158 | 293.3 | 480 | — |
| | Barium titanate: BESPA (10 μm) | — | — | — | — | — | — |
| Ceramic material volume fraction (based on resin + all ceramic) [volume %] | | 60 | 60 | 60 | 60 | 60 | 55 |
| Flaky ceramic volume fraction (based on all ceramic) [volume %] | | 0 | 0 | 20 | 40 | 60 | 0 |
| Direction of a-axis orientation of ceramic material in ceramic sheet | | Perpendicular | Perpendicular | Perpendicular | Perpendicular | Perpendicular | Perpendicular |
| Perpendicular orientation parameter [—] | | 3.25 | 3.09 | 3.91 | 3.89 | 3.73 | 3.55 |
| Primary sheet thickness [mm] | | 1 | 1 | 1 | 1 | 1 | 1 |
| Fired or unfired | | Fired | Fired | Fired | Fired | Fired | Fired |
| Lotgering factor for a-axis [—] | | 0.0174 | 0.0142 | 0.0221 | 0.0291 | 0.0352 | 0.0204 |
| Lotgering factor for c-axis [—] | | −0.0005 | −0.0009 | −0.0015 | −0.0012 | −0.002 | −0.0002 |
| XRD scattering intensity [—] | Alumina XRD (006) 2θ: 41.6° | 35.86 | 32.62 | 14.23 | 263 | 275 | 32.62 |
| | Alumina XRD (300) 2θ: 68.1° | 2275.32 | 1967.00 | 1087.44 | 19987 | 20044 | 2264.23 |
| | Barium titanate XRD (002) 2θ: 44.8° | — | — | — | — | — | — |
| | Barium titanate XRD (200) 2θ: 45.4° | — | — | — | — | — | — |
| a-Axis orientation (a/c) [—] | Alumina: (300) ÷ (006) | 63.45 | 60.30 | 76.42 | 76.00 | 72.89 | 69.41 |
| | Barium titanate: (200) ÷ (002) | — | — | — | — | — | — |
| Thermal conductivity | X-Axis direction thermal conductivity [W/m · K] | 20 | 22 | 20 | 21 | 22 | 19 |
| | Y-Axis direction thermal conductivity [W/m · K] | 20 | 20 | 22 | 23 | 21 | 18 |
| | Z-Axis direction thermal conductivity [W/m · K] | 21 | 23 | 37 | 46 | 62 | 20 |

TABLE 1-continued

| | | | | | | |
|---|---|---|---|---|---|---|
| Anisotropy parameter of thermal conductivity [—] | 1.05 | 1.15 | 1.68 | 2.00 | 2.82 | 1.05 |
| Quality of ceramic sheet | A | A | A | B | C | B |

| | | Example 7 | Example 8 | Comparative Example 1 | Comparative Example 2 | Comparative Example 3 |
|---|---|---|---|---|---|---|
| Resin [parts by mass] | Nipol 1312 (liquid) | 62 | 40 | 62 | 62 | 40 |
| | Nipol 3350 (solid) | 62 | 40 | 62 | 62 | 40 |
| Ceramic material [parts by mass] | Particulate alumina: LS-711C (0.5 μm) | 700 | — | 700 | 700 | — |
| | Particulate alumina: LS-130F (3 μm) | — | — | — | — | — |
| | Flaky alumina: Serath (10 μm) | — | — | — | — | — |
| | Barium titanate: BESPA (10 μm) | — | 900 | — | — | 900 |
| Ceramic material volume fraction (based on resin + all ceramic) [volume %] | | 60 | 65 | 60 | 60 | 65 |
| Flaky ceramic volume fraction (based on all ceramic) [volume %] | | 0 | 0 | 0 | 0 | 0 |
| Direction of a-axis orientation of ceramic material in ceramic sheet | | Perpendicular | Perpendicular | Planar | Perpendicular | Planar |
| Perpendicular orientation parameter [—] | | 3.46 | 1.55 | — | — | — |
| Primary sheet thickness [mm] | | 2 | 1 | — | 1 | 1 |
| Fired or unfired | | Fired | Fired | Fired | Unfired | Fired |
| Lotgering factor for a-axis [—] | | 0.0112 | 0.0183 | −0.0418 | — | −0.00219 |
| Lotgering factor for c-axis [—] | | −0.0001 | −0.0017 | 0.0015 | — | 0.0021 |
| XRD scattering intensity [—] | Alumina XRD (006) 2θ: 41.6° | 41.22 | — | 90.85 | — | — |
| | Alumina XRD (300) 2θ: 68.1° | 2784.36 | — | 1775.62 | — | — |
| | Barium titanate XRD (002) 2θ: 44.8° | — | 5292 | — | — | 6110 |
| | Barium titanate XRD (200) 2θ: 45.4° | — | 13346 | — | — | 9923 |
| a-Axis orientation (a/c) [—] | Alumina: (300) ÷ (006) | 67.55 | — | 19.545 | — | — |
| | Barium titanate: (200) ÷ (002) | — | 2.52 | — | — | 1.62 |
| Thermal conductivity | X-Axis direction thermal conductivity [W/m · K] | 20 | 2.1 | 20 | 3 | 2.2 |
| | Y-Axis direction thermal conductivity [W/m · K] | 19 | 2.2 | 20 | 0.2 | 2.1 |
| | Z-Axis direction thermal conductivity [W/m · K] | 21 | 2.4 | 19 | 4 | 2 |
| Anisotropy parameter of thermal conductivity [—] | | 1.05 | 1.09 | 0.95 | 1.3 | 0.91 |
| Quality of ceramic sheet | | B | A | A | — | A |

It can be seen from Table 1 that the ceramic sheet formed of a sintered body of a ceramic that was obtained in each of Examples 1 to 8 had a novel orientation structure in terms that an a-axis value was positive upon Lotgering analysis and that an a-axis orientation direction of ceramic material in the ceramic sheet was a perpendicular direction (thickness direction of ceramic sheet).

INDUSTRIAL APPLICABILITY

According to the present disclosure, it is possible to provide a ceramic sheet having a novel orientation structure.

The invention claimed is:

1. A method of producing a ceramic sheet comprising:

shaping a composition containing a resin and a ceramic material into a sheet-like form through pressure application to obtain a primary sheet, wherein a volume fraction of the ceramic material in the primary sheet is not more than 65 volume % based on total volume of the resin and the ceramic material;

stacking a plurality of the primary sheet in a thickness direction or performing folding or winding of the primary sheet to obtain a laminate;

slicing the laminate at an angle of 45° or less relative to a stacking direction to obtain a secondary sheet;

firing the secondary sheet so as to obtain the ceramic sheet having a value a/c of not less than 60.30, obtainable by dividing a-axis value by c-axis value upon Lotgering method, and the volume fraction of the ceramic material in the primary sheet is not less than 60 volume % based on the total volume of the resin and the ceramic material.

2. The method of producing a ceramic sheet according to claim 1, wherein debinding of the secondary sheet through heating in an atmosphere of 300° C. or higher is performed in advance of the firing, and the firing is performed in an atmosphere of 1000° C. or higher.

3. The method of producing a ceramic sheet according to claim 1, wherein the primary sheet has a thickness of 2.5 mm or less.

4. The method of producing a ceramic sheet according to claim 1, wherein the volume fraction of the ceramic material in the primary sheet is not less than 50 volume % based on the total volume of the resin and the ceramic material.

* * * * *